(12) United States Patent
Creamer et al.

(10) Patent No.: US 12,505,482 B2
(45) Date of Patent: *Dec. 23, 2025

(54) GENERATING ACTIONABLE GRAPHICAL OBJECTS BASED ON DISAGGREGATED NON-STANDARDIZED RAW DATA

(71) Applicant: Geneva Technologies, LLC, Chicago, IL (US)

(72) Inventors: Robert S. Creamer, Chicago, IL (US); Edward Paul Krauss, Chicago, IL (US); Geoffrey R. Myers, Jr., Wilmette, IL (US); Frank Bruen, Malahide (IE)

(73) Assignee: Geneva Technologies, LLC, Chicago, IL (US)

( * ) Notice: Subject to any disclaimer, the term of this patent is extended or adjusted under 35 U.S.C. 154(b) by 225 days.

This patent is subject to a terminal disclaimer.

(21) Appl. No.: 18/113,401

(22) Filed: Feb. 23, 2023

(65) Prior Publication Data
US 2023/0196464 A1 Jun. 22, 2023

Related U.S. Application Data

(63) Continuation of application No. 17/741,339, filed on May 10, 2022, now Pat. No. 11,593,883, which is a (Continued)

(51) Int. Cl.
*G06Q 40/04* (2012.01)
*G06F 3/048* (2013.01)
(Continued)

(52) U.S. Cl.
CPC ............ *G06Q 40/04* (2013.01); *G06F 3/048* (2013.01); *G06F 3/0482* (2013.01); *G06Q 30/0202* (2013.01); *G06T 11/60* (2013.01)

(58) Field of Classification Search
CPC .... G06Q 40/04; G06Q 30/0202; G06F 3/048; G06F 3/0482; G06F 3/04847; G06T 11/60
See application file for complete search history.

(56) References Cited

U.S. PATENT DOCUMENTS

| 6,766,207 B2 | 7/2004 | Sato et al. |
| 6,766,304 B2 | 7/2004 | Kemp, II et al. |

(Continued)

FOREIGN PATENT DOCUMENTS

| EP | 1904966 | 4/2008 |
| GB | 2395819 | 6/2004 |

OTHER PUBLICATIONS

Nousi et al., "Machine learning for forecasting mid-price movements using limit order book data," IEEE Access 7, 2019: 64722-64735.

(Continued)

*Primary Examiner* — Cao H Nguyen
(74) *Attorney, Agent, or Firm* — Perkins Coie LLP

(57) ABSTRACT

Methods and systems are disclosed for generating a view of data to emphasize similar orders or patterns. Based on a pattern associated with a particular characteristic in a set of data, at least a subset of a plurality of data groupings to display is determined. For a particular subset of data groupings to display, a first graphical object is generated. A second graphical object represents an executable algorithm. After detecting user input causing a change in placement of the second graphical object in relation to the first graphical object, an automatic operation indicated by the executable algorithm is executed in connection with an item in the at least one order grouping indicated by the first graphical object.

20 Claims, 12 Drawing Sheets

Related U.S. Application Data continuation-in-part of application No. 17/665,277, filed on Feb. 4, 2022, now abandoned, which is a continuation of application No. 16/146,346, filed on Sep. 28, 2018, now abandoned, which is a continuation of application No. 13/837,945, filed on Mar. 15, 2013, now abandoned.

(51) Int. Cl.
  *G06F 3/0482* (2013.01)
  *G06Q 30/0202* (2023.01)
  *G06T 11/60* (2006.01)

(56) References Cited

U.S. PATENT DOCUMENTS

| | | |
|---|---|---|
| 6,772,122 B2 | 8/2004 | Jowitt et al. |
| 6,772,132 B1 | 8/2004 | Kemp, II et al. |
| 7,107,226 B1 | 9/2006 | Cassidy et al. |
| 7,113,924 B2 | 9/2006 | Fishbain |
| 7,117,182 B2 | 10/2006 | Chess et al. |
| 7,127,424 B2 | 10/2006 | Kemp, II et al. |
| 7,212,999 B2 | 5/2007 | Friesen et al. |
| 7,228,289 B2 | 6/2007 | Brumfield et al. |
| 7,389,258 B2 | 6/2008 | Brumfield et al. |
| 7,412,416 B2 | 8/2008 | Friesen et al. |
| 7,418,422 B2 | 8/2008 | Burns |
| 7,533,056 B2 | 5/2009 | Friesen et al. |
| 7,630,986 B1 | 12/2009 | Herz |
| 7,685,024 B2 | 3/2010 | Ofer et al. |
| 7,870,059 B2 | 1/2011 | Shapiro et al. |
| 7,890,396 B2 | 2/2011 | Weinstein |
| 8,170,940 B2 | 5/2012 | Tully |
| 8,175,955 B2 | 5/2012 | Friesen et al. |
| 8,190,501 B2 | 5/2012 | Kemp, II et al. |
| 8,296,221 B1 | 10/2012 | Waelbroeck |
| 9,600,843 B2 | 3/2017 | Creamer et al. |
| 10,204,379 B2 | 2/2019 | Creamer |
| 10,607,290 B2 | 3/2020 | Creamer et al. |
| 10,909,626 B2 | 2/2021 | Creamer |
| 10,922,753 B2 | 2/2021 | Creamer et al. |
| 11,263,603 B1 | 3/2022 | Dhodapkar |
| 11,373,244 B2 | 6/2022 | Sandhu |
| 11,593,883 B2 | 2/2023 | Creamer et al. |
| 2002/0143690 A1 | 10/2002 | Mahajan et al. |
| 2003/0033212 A1 | 2/2003 | Sandhu |
| 2003/0055664 A1 | 3/2003 | Suri |
| 2003/0088495 A1 | 5/2003 | Gilbert et al. |
| 2004/0073496 A1 | 4/2004 | Cohen |
| 2005/0149429 A1 | 7/2005 | Kemp et al. |
| 2006/0106707 A1 | 5/2006 | Shetty et al. |
| 2007/0083452 A1 | 4/2007 | Mayle |
| 2007/0111777 A1 | 5/2007 | Amaitis |
| 2007/0179876 A1* | 8/2007 | Stark ............... G06Q 40/00 705/35 |
| 2007/0265954 A1* | 11/2007 | Mather ............. G06F 3/0481 705/37 |
| 2007/0271172 A1* | 11/2007 | Shapiro ............ G06Q 40/03 705/37 |
| 2008/0177994 A1 | 7/2008 | Mayer |
| 2008/0183639 A1 | 7/2008 | DiSalvo |
| 2008/0249956 A1 | 10/2008 | Connors |
| 2008/0288889 A1 | 11/2008 | Hunt |
| 2009/0043664 A1 | 2/2009 | Lutnick |
| 2009/0177543 A1 | 7/2009 | Ram et al. |
| 2009/0182656 A1* | 7/2009 | Tully ............... G06Q 40/00 705/35 |
| 2009/0234710 A1 | 9/2009 | Belgaied Hassine et al. |
| 2010/0049535 A1 | 2/2010 | Chari et al. |
| 2010/0057627 A1 | 3/2010 | Lutnick |
| 2010/0198661 A1 | 8/2010 | McMurray et al. |
| 2010/0235273 A1 | 9/2010 | Friesen et al. |
| 2010/0268634 A1 | 10/2010 | Mackey, Jr. et al. |
| 2010/0293110 A1* | 11/2010 | Rosenthal ........ G06Q 40/06 715/788 |
| 2010/0318458 A1 | 12/2010 | West |
| 2011/0040669 A1 | 2/2011 | Lee |
| 2011/0161222 A1 | 6/2011 | Shapiro et al. |
| 2011/0258036 A1 | 10/2011 | Ioffe et al. |
| 2011/0264579 A1 | 10/2011 | Kline |
| 2012/0047060 A1 | 2/2012 | Fossler, II |
| 2012/0084190 A1 | 4/2012 | Messina |
| 2012/0150713 A1 | 6/2012 | Russel et al. |
| 2012/0317053 A1 | 12/2012 | Gartland et al. |
| 2013/0054439 A1 | 2/2013 | Zhao |
| 2013/0060671 A1 | 3/2013 | Lawrence |
| 2013/0097664 A1 | 4/2013 | Herz |
| 2013/0117198 A1 | 5/2013 | Hogan |
| 2013/0297474 A1 | 11/2013 | Creamer et al. |
| 2013/0317961 A1 | 11/2013 | Malatesta |
| 2014/0095365 A1 | 4/2014 | Potekhina |
| 2014/0279344 A1 | 9/2014 | Creamer et al. |
| 2014/0279345 A1 | 9/2014 | Burns |
| 2014/0344186 A1 | 11/2014 | Nadler |
| 2015/0081505 A1 | 3/2015 | Co et al. |
| 2016/0063623 A1 | 3/2016 | Rooney |
| 2016/0132966 A1 | 5/2016 | Creamer et al. |
| 2016/0350855 A1 | 12/2016 | Lerner |
| 2017/0236204 A1 | 8/2017 | Creamer et al. |
| 2019/0121338 A1 | 4/2019 | Celia |
| 2019/0172144 A1 | 6/2019 | Creamer |
| 2019/0205982 A1 | 7/2019 | Creamer et al. |
| 2019/0324444 A1 | 10/2019 | Celia |
| 2020/0151815 A1 | 5/2020 | Whitfield |
| 2020/0364790 A1 | 11/2020 | Creamer et al. |
| 2021/0182882 A1 | 6/2021 | Mitchell |
| 2021/0357772 A1 | 11/2021 | Egorov |

OTHER PUBLICATIONS

Ta et a;., "Prediction and portfolio optimization in quantitative trading using machine learning techniques," Proceedings of the Ninth International Symposium on Information and Communication Technology, 2018.

Roberts, Pasha., "Information visualization of the stock market ticks: toward a new trading interface," Diss Massachusetts Institute of Technology, 2003.

Sastry, Lakshmi., "User interface managment systems for engineering applications," Computer graphics forum vol. 11., No. 2., Edinburgh, UK, Blackwell Science Ltd., 1992.

Hochheiser et al., "Dynamic query tools for time series data sets: timebox widgets for interactive exploration," Information Visualization 3.1, 2004, 1-18.

Sorenson et al., "Financial Visualization Case Study: Correlating Financial Timeseries and Discrete Events to Support Investment Decisions," 17th International Conference on Information Visualisation, 2013, 7 pages.

White, Ron. "How Computers Work, 9th Edition," Que, Indianapolis, IN, published Nov. 14, 2007, 465 pages.

* cited by examiner

GENERATING ACTIONABLE GRAPHICAL OBJECTS BASED ON DISAGGREGATED NON-STANDARDIZED RAW DATA

CROSS-REFERENCE TO RELATED APPLICATION

This application is a continuation of U.S. patent application Ser. No. 17/741,339, titled "GENERATING ACTIONABLE GRAPHICAL OBJECTS BASED ON DISAGGREGATED NON-STANDARDIZED RAW DATA" and filed on May 10, 2022, which is a continuation-in-part of U.S. patent application Ser. No. 17/665,277, titled "METHODS AND SYSTEMS FOR SHOWING PERSPECTIVES IN MARKET DATA" and filed Feb. 4, 2022, which is a continuation of both U.S. patent application Ser. No. 16/146,346, titled "METHODS AND SYSTEM FOR SHOWING PERSPECTIVE IN MARKET DATA" filed Sep. 28, 2018 and U.S. patent application Ser. No. 13/837,945, titled "METHODS AND SYSTEM FOR SHOWING PERSPECTIVE IN MARKET DATA" filed on Mar. 15, 2013, the disclosures of which are incorporated herein by reference in their entireties.

BACKGROUND

A trader is a market participant who places or manages one or more orders to buy and/or sell a number of stocks, bonds, futures, securities, commodities, options, currencies, swaps, and other financial instruments or derivatives thereof. A modern trader may use computer software (e.g., "trading software") to search for and analyze financial instruments that exhibit specific characteristics or patterns. Current trading software inefficiently occupies a computer screen's space by, for example, displaying a portion of market data without prioritizing data of importance to a trader. For example, current trading software does not efficiently occupy small screens, such as screens for mobile devices, tablets, and so forth. And current trading software does not prioritize data of importance to a trader using a device with a small screen, which can result in potential loss of value to the trader. Lack of knowledge of the current market activities and/or inefficient display of market data obscures pertinent trading information that can result in a potential loss of value to the trader.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
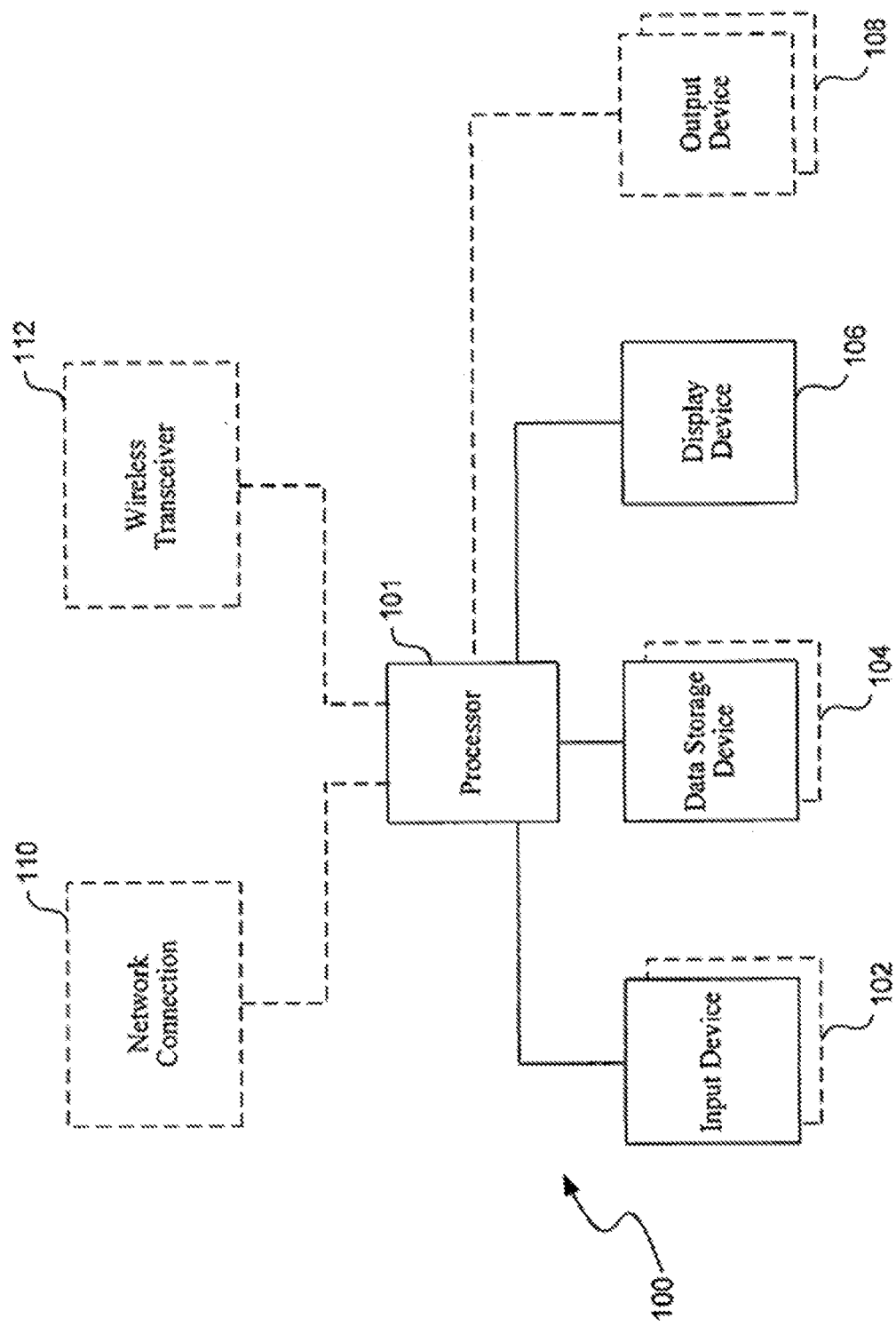
FIG. 1 is a block diagram of a basic and suitable computer that may employ aspects of the software and/or hardware facilities.

The inventors have recognized that existing trading software does not efficiently deemphasize non-priority data while emphasizing more important data to enable the trader to quickly place orders based on real- or near real-time market data. To "emphasize" or "deemphasize" data can refer to segmenting data into sets that distinguish one set of data as from another set of data. One set of data can get highlighted over the other set of data by using different human perceptible methods. Accordingly, the inventors developed software and/or hardware facilities for minimizing less important market data while generating and presenting a disaggregated view of market data that emphasizes important information (e.g., trading patterns, the number of orders or traders in the market at a given time or at a given price, the sequence of the orders at a given price, the trader's respective number of order entries, and/or user-defined characteristics associated with individual or groups of market orders).

In some embodiments, the software and/or hardware facilities disaggregate data into one or more order portions of market data from raw market data for display as information that emphasizes one or more groups of orders at one or more prices, for example. More generally, the facilities can disaggregate data into a common format that enables emphasizing aspects of data and/or deemphasizing other aspects of the data, at different levels of granularity. In other embodiments, the software and/or hardware facilities display market data which has been partially processed (e.g., partially disaggregated), for example, based on one or more algorithms designed to approximate real market data and/or a market data having partial or full order details, such as data received from InterContinentalExchange (ICE). Disaggregating and/or displaying orders from raw and/or partially processed aggregated data ("market data") is important to a trader because it can provide a rich "microscopic" perspective of other traders' market activities, such as their "resting orders" (i.e., orders that have been in the market for a period of time), order sequencing across the same or different prices, and various trading patterns or user-defined identifiers, for example.

In various embodiments, the software and/or hardware facilities' method of interpolation is adjustable to control how granular or "aggressive" it recognizes an order or a user-defined order pattern. In particular, interpolation estimates unknown data points within the range of known data points. Linear interpolation is one method of estimating values at positions between known data points. The points are joined by straight line segments. The interpolation can be changed to find different patterns of data points among a set of given data points. Performing interpolation based on different sets of known data points can yield estimates of data points that form different patterns. In one example, instead of interpreting a total quantity to buy 5 items at a specific price as a single order, the software and/or hardware facilities can interpret that the 5 items are each from 5 separate orders. Additionally and/or alternatively, the software and/or hardware facilities are configured to filter from display orders with item numbers above, below, or at a defined number (e.g., do not show any order for a quantity of less than 5 items). In some embodiments, the software and/or hardware facilities disaggregate orders by interpolating coalesced market data to find new data that is segmented into groups that define patterns.

The software and/or hardware facilities emphasize disaggregated groups of market data using one or more of a variety of emphasis techniques. In some embodiments, visual indicators (e.g., color, color changes, highlighting, flashing, graphics, changing font size/color, icons, 2D or pseudo 3D shapes, a heat map, augmented reality) are used to emphasize orders, patterns, or other aspects within the disaggregated market data.

In some embodiments, audible-based indicators (e.g., tones, music), electronic communication-based indicators (e.g., sending an email, SMS, or other messaging technique), and/or electro-mechanical indicators (e.g., an external alert system) are used by the software and/or hardware facilities to emphasize to a trader important information in the disaggregated market data. In on example, the facilities can trigger an alert when a particular pattern is recognized among market data. The alert can include generating an electronic message that is communicated over a computer network to a computing device of a user. The electronic message can activate an application on the computing device and/or present the electronic message to the user. The software and/or hardware facilities are user configurable, e.g., a trader can adjust the software and/or hardware facilities to use any one or more of the above-mentioned emphasis techniques to emphasize any one or more orders, patterns, user-defined identifiers, or other features within the disaggregated market data.

In some embodiments, the software and/or hardware facilities link orders with one or more traders, brokerage firms, or user-defined analytics (e.g., trading software-based algorithms) by grouping orders based on their price, respective entry times, and/or quantity for example. In various embodiments, a trader or firm can be tracked based on a unique identifier in an order. Once identified, the software and/or hardware facilities can display and track the individual's or groups' activities (e.g., trades, cancellations, reduction, movement) within a real-time market environment (e.g., commodities trading). In various embodiments, order movement is tracked within a single price (e.g., a group of 10 orders at $100); however, in some embodiments, order movement is tracked from one price (e.g., 10 orders at $100) to another price (e.g., 10 orders at $110). Order activity is emphasized to a trader based on one or more of the above-mentioned variety of emphasis techniques.

For example, an aggregated market view of selling oil may be 500 items (e.g., contracts) at a specific price of $97.08. The disaggregated view of orders provided by the software and/or hardware facilities may consist of the sum (i.e., the overall quantity) of a first order of 100 items, a second order of 100 items, a third order of 100 items, a fourth order of 25 items, a fifth order of 75 items, and a sixth order of 100 items, for example. The software and/or hardware facilities can display the disaggregated groups of orders and indicate via one or more of the above-mentioned emphasis techniques that the first, second, third, and sixth orders are similar (i.e., each order is for 100 contracts) for example. For example, each of the first, second, third, and sixth order may be represented by flashing green shapes and/or icons, etc. This is useful to a trader because this pattern may be indicative of "auto-trading" (e.g., software that automatically enters orders based on an algorithm) or some other pattern that enables the trader a more educated view of the market. Isolating market order patterns allows a trader to "see" that the first order, for example, is a resting order that has been in the market for a lengthy period of time. In one example, the facilities can distinguish between machine-generated orders (e.g., auto-trading) and non-machine-generated orders based on, for example, the patterns of orders (e.g., frequency, quantity, source, periodicity).

In another example, the software and/or hardware technology can visually display temporal changes to market data. For example, disaggregated orders can be displayed as a heat-map that shows, for example, changes to an order over time. An order can fade between a gradient of colors based on when the order was placed, for example. Multiple orders spread across the same or a variety of prices are visually depicted as "hot" to "cold" indicators, such as fading from bright green to black as an order ages in the queue of orders. The rate at which an order fades is configured by a trader or predetermined by the software and/or hardware facilities. For example, a trader may select that orders older than 3 minutes begin to fade from green to black. Other scenarios have been considered by the inventors, such as choosing the heat map color scheme, using graphical indicators other than coloring (e.g., fading out an icon), and displaying price-specific heat maps (e.g., one price's heat map fades from blue-to-black for orders over 10 minutes and second price's heat map fades from green-to-black for order over 3 minutes).

The software and/or hardware facilities, in some embodiments, are used for creating and/or executing orders based on disaggregated market data. For example, order algorithms for executing a trade are, in a variety of embodiments, depicted as graphical indicia (e.g., shapes, icons, pictures, graphics) on a user-interface provided by the software and/or hardware facilities. In some embodiments, the graphical indicia are automatically arranged relative to a holding "pen" containing representations of other algorithms. The graphical indicia can be configured to cause the software and/or hardware facilities to execute an algorithm for one or more orders based on one or more aspects of the disaggregated market data. For example, an icon representing an algorithm to purchase "X" numbers of contracts can be moved (e.g., slid across the screen via a finger or stylus, voice controlled, or dragged-and-dropped via a mouse, etc.) on top of or near a portion of the disaggregated data. The software and/or hardware facilities detects the proximity of the icon, for example, and can execute an order at the same price as the price represented by the disaggregated data. In some embodiments, an algorithm whose icon, for example, was placed on a portion of the disaggregated data delays execution based on the occurrence of an event. For example, the software and/or hardware facilities can follow the activity of an order selected from the disaggregated orders. If the selected order is traded, cancelled, or reduced, for example, the software and/or hardware facilities can automatically create a new order, modify an order, or cancel an order, for example.

Furthermore, the software and/or hardware facilities, in some embodiments, may include additional features and employ aspects of the assignee' US Patent Application entitled, "METHODS AND SYSTEMS FOR SHOWING PERSPECTIVE IN MARKET DATA" (Ser. No. 13/463,753), filed on May 3, 2012, which is incorporated by reference herein in its entirety.

In some embodiments the software and/or hardware facilities provide an improved user interface for displaying aggregated and/or disaggregated data (e.g., orders or groups of orders), such as a user interface configured for display on a small screen (e.g., a mobile device or tablet screen). In these and other embodiments, the user interface can display a summary view of the data to emphasize important data and deemphasize or omit unimportant data. For example, the summary view can emphasize display of one or more identified patterns or groups in the data, such as a pattern that indicates auto-trading. The summary view can employ one or more emphasis techniques described herein. In some embodiments, generating the improved user interface can include determining a subset of data to be displayed. For example, the software and/or hardware facilities can determine a subset of data to be displayed based on one or more dimensions associated with a display screen on which the user interface is being displayed (e.g., screen size, pixel dimensions). Considering the one or more dimensions of the display screen, the software and/or hardware facilities can identify and prioritize for display a subset of the data that contains one or more identified patterns or groups that a trader might use to execute one or more trades. Remaining portions of the data are, thus, deemphasized or omitted from display in the user interface on a small screen display device.

In some embodiments, the hardware and/or software facilities can include one or more data disaggregation models that are used to disaggregate data and identify patterns or groups within the data, such as groups of orders that are similar or patterns within data indicating auto-trading. The one or more data disaggregation models can include machine learning models that are trained using a training dataset to identify the patterns or groups.

Various embodiments of the software and/or hardware facilities are described below. The following description provides specific details for a thorough understanding and enabling description of these embodiments. One skilled in the art will understand that the software and/or hardware facilities may be practiced without many of these details. Additionally, some well-known structures or functions may not be shown or described in detail, so as to avoid unnecessarily obscuring of the relevant description of the various embodiments.

The terminology used in the description presented is intended to be interpreted in its broadest reasonable manner, even though it is being used in conjunction with a detailed description of certain specific embodiments of the software and/or hardware facilities. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIG. 1 and the following discussion provide a brief, general description of a suitable computing environment in which aspects of the software and/or hardware facilities can be implemented. Although not required, aspects of the software and/or hardware facilities may be described herein in the general context of computer-executable instructions, such as routines executed by a general or special-purpose data processing device (e.g., a server or client computer). Aspects of the software and/or hardware facilities described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the software and/or hardware facilities may be distributed over the Internet or over other networks (including wireless networks) on a propagated signal on a propagation medium (e.g., an electromagnetic wave, a sound wave) over a period of time. In some implementations, the data may be provided on any analog or digital network (packet switched, circuit switched, or other scheme).

The software and/or hardware facilities can also be practiced in distributed computing environments where tasks or modules are performed by remote processing devices, which are linked through a communications network, such as a Local Area Network (LAN), Wide Area Network (WAN), or the Internet. In a distributed computing environment, program modules or sub-routines may be located in both local and remote memory storage devices. Those skilled in the relevant art will recognize that portions of the software and/or hardware facilities may reside on a server computer, while corresponding portions reside on a client computer (e.g., PC, mobile computer hybrid, tablet, visual aid, or smart phone). Data structures and transmission of data particular to aspects of the software and/or hardware facilities are also encompassed within the scope of the software and/or hardware facilities.

Referring to FIG. 1, the software and/or hardware facilities employs a computer 100, such as a personal computer, workstation, phone, tablet, hybrid, or visual aid having one or more processors 101 coupled to one or more user input devices 102 and data storage devices 104. The computer 100 is also coupled to at least one output device such as a display device 106 and one or more optional additional output devices 108 (e.g., printer, plotter, speakers, tactile, or olfactory output devices). The computer 100 may be coupled to external computers, such as via an optional network connection 110, a wireless transceiver 112, or both. For example, network hubs, switches, routers, or other hardware network components connected directly or indirectly to the network connection 110 and/or wireless transceiver 112 can couple one or more computers 100.

The input devices 102 may include a keyboard and/or a pointing device such as a mouse. Other input devices are possible, such as a microphone, joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video discs (DVDs), Bernoulli cartridges, RAMs, ROMs, smart cards, etc. Indeed, any medium for storing or transmitting computer-readable instructions and data may be employed, including a connection port or node on a network, such as a LAN, WAN, or the Internet (not shown in FIG. 1).

Each of the above-mentioned features of the software and/or hardware facilities are further described below.

Figure 2:
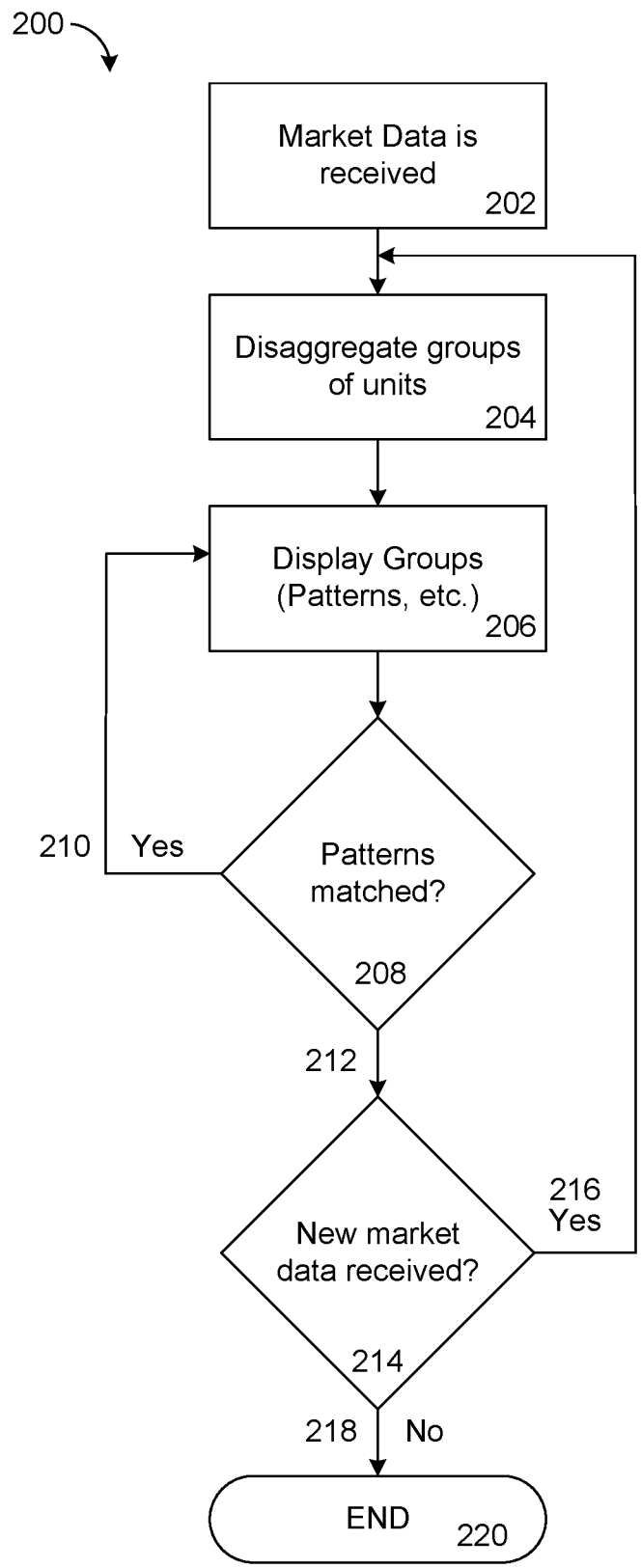
FIG. 2 is a diagram showing a process flow used by the software and/or hardware facilities to identify groups and patterns of orders disaggregated from raw or partially processed market data.

FIG. 2 is a diagram showing a process flow 200 used by the software and/or hardware facilities to identify groups and patterns of orders from market data. FIG. 2 includes blocks 202-220. At step 202, market data is received from an external source (e.g., NASDAQ, ICE, etc.) or from an internal source (e.g., synthetically generated content/orders to approximate real market data, based on mathematical models, etc.). At step 204, aggregated market data is disaggregated into one or more groups of orders, based on various characteristics (e.g., the overall quantity of orders placed at a given time) detected in the market data. At step 206, disaggregated groups are displayed using one or more of the above-mentioned variety of emphasis techniques. At step 208, if any patterns or user-defined characteristics are detected within the market data then, at step 210, the flow returns to step 206 where one or more groups of orders are emphasized using one or more of the above-described variety of emphasis techniques. In some embodiments, detecting patterns in market data can be performed using a data disaggregation model, such as a machine learning model trained as described herein. However, if a pattern is not detected then, at step 212, the flow goes to step 214 and the software and\or hardware facilities determine whether or not to process any new market data, if any. If so, at step 216, the flow returns to step 204 where the new market data is disaggregated (in the case raw market data that is not disaggregated) into one or more groups, as described above. If there is no new market data to process, at step 218, then the flow ends at step 212.

Figure 3:
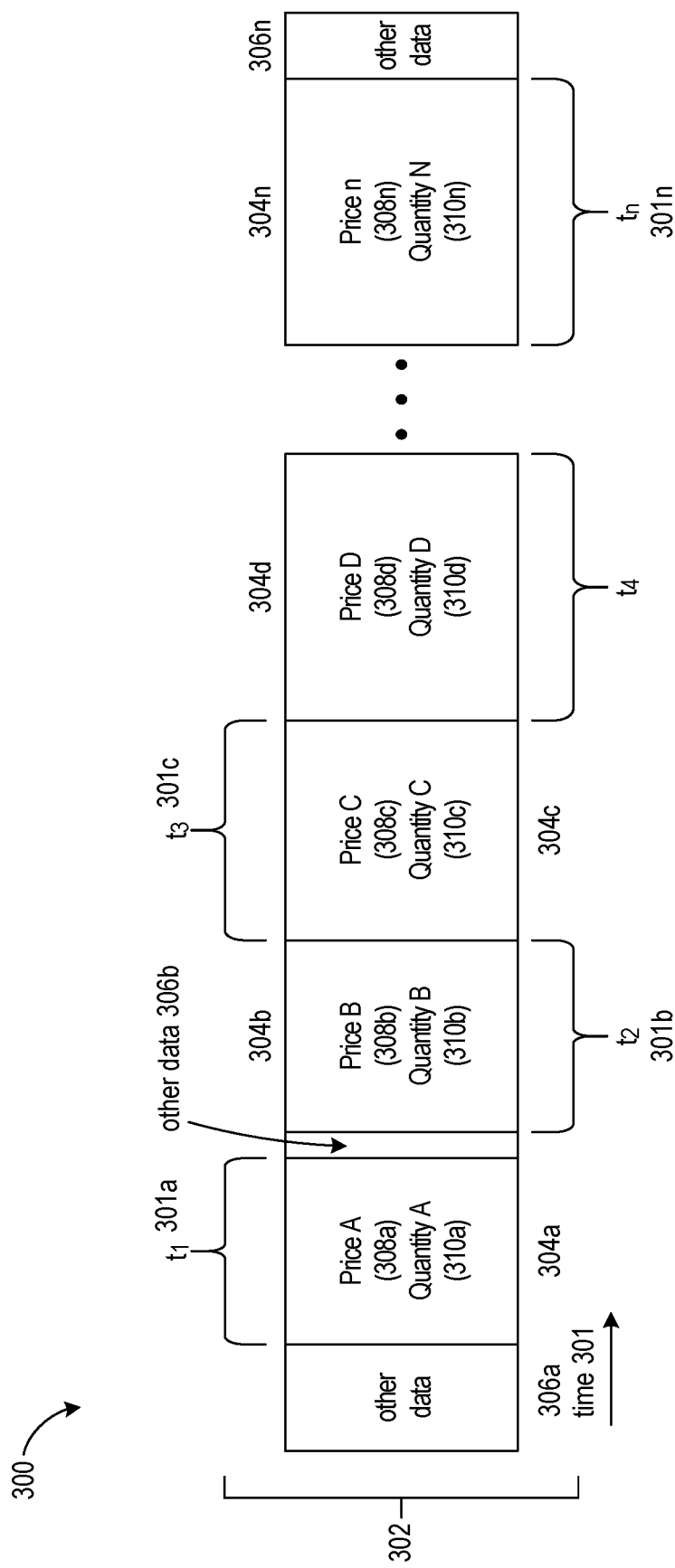
FIG. 3 is a block diagram illustrating market data.

Process flow 200 is described in more detail in reference to FIGS. 4-11. As described above, at step 202, market data is received by the software and/or hardware facilities, as depicted in FIG. 3. FIG. 3 is a block diagram 300 illustrating market data 302. Market data 302 is an example of Level 1 market data that includes various orders 304a-304n placed at times 301a-301n, respectively, for a total overall quantity 310a-310e of one or more financial instruments (e.g., oil contracts, stock trades, currency trades, etc.) at a respective price 308a-308n. Orders 304a-304n are received chronologically based on their respective entry times 301a-301n. Market data 302 can also include other data 306a-306n, such as market "noise" or less important market information, that can be filtered by the software and/or hardware facilities.

Figure 4:
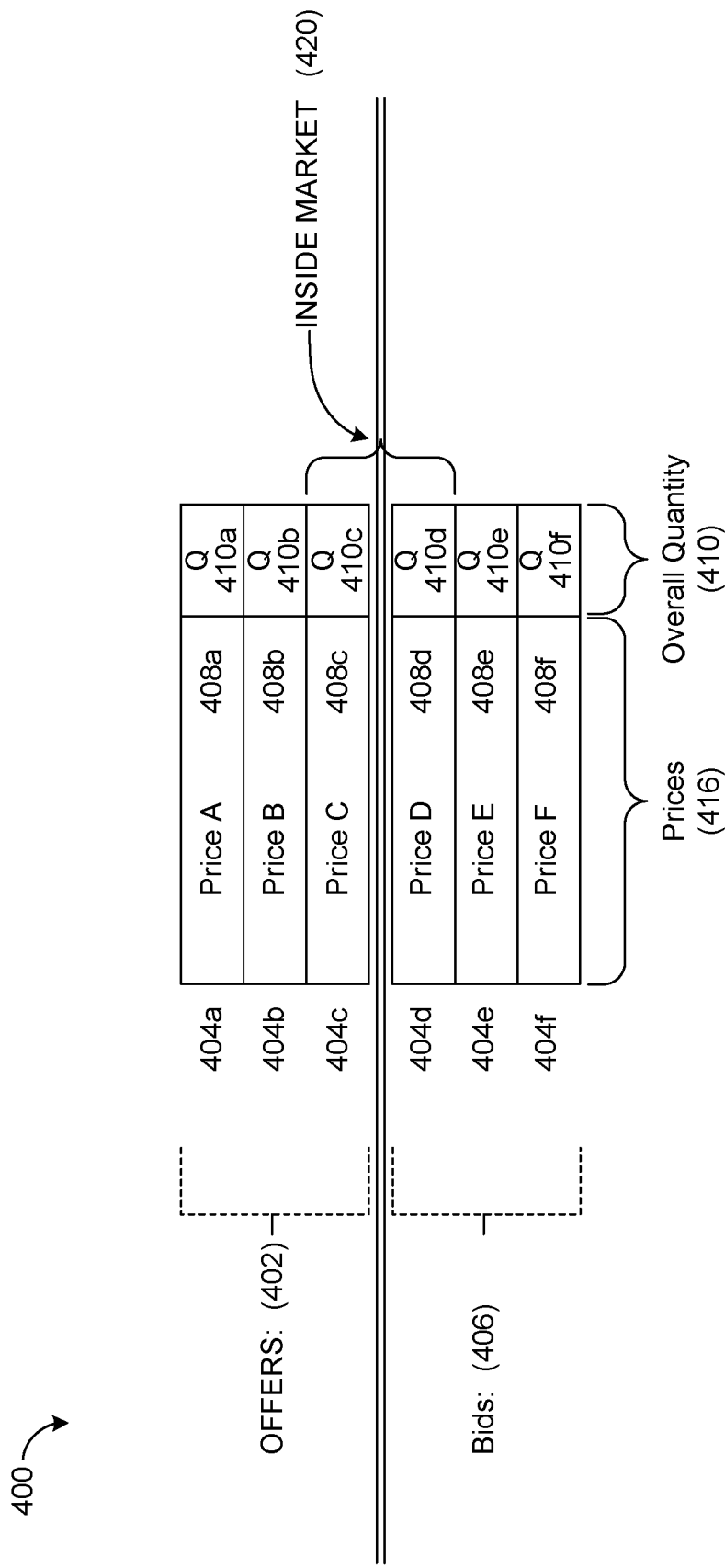
FIG. 4 is a graphical user interface showing an aggregated view of bids and/or orders.

FIG. 4 is a graphical user interface 400 showing an aggregated view of bids 406 and orders 402 for securities (e.g., oil contracts). Offers 402 include price-quantity pairs 404a-404c and bids 406 include price-quantity pairs 404d-404f. Each price-quantity pair 404a-404f includes a corresponding price 408a-408f and an aggregated quantity 410a-410f for trading the security. The aggregated quantities (e.g., the total quantity) 410a-410f of the price-quantity pair 404a-404f is the sum of all orders placed at a particular price (e.g., 408a). For example, price-quantity pair 404a may represent a total quantity 410a of 100 items (e.g., oil contracts) at a price 408a of $93. Similarly, price-quantity pairs 404b-404f each correspond to a respective price 408b-408f for a respective aggregated quantity 410b-410f of orders. Each price-quantity pair 404a-404f is stacked in relationship to their relative position to an inside market 420 (i.e., the spread between the highest bid price and lowest ask price). For example, offer 402 price-quantity pair 404c and bid price-quantity pair 404d are said to be in the inside market 420 because offer 404c has the lowest offer price 408c and bid 404d has the highest bid price 408d.

Figure 5A:
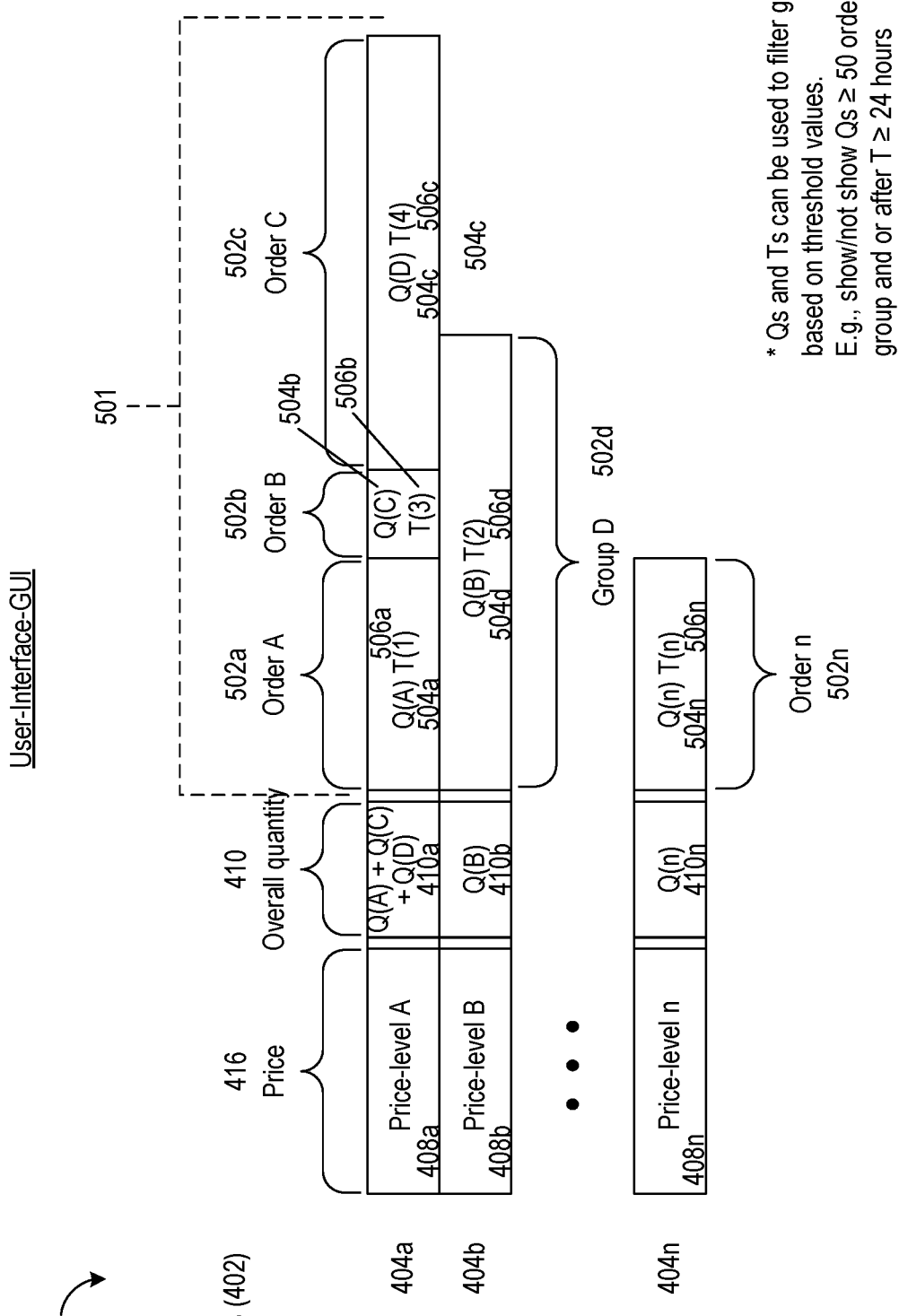
FIG. 5A is a graphical user interface implemented by the software and/or hardware facilities to show groups of orders disaggregated from market data.

Returning to FIG. 2, at step 206, at least portions of the market data 302 is disaggregated into one or more groups of orders, as discussed in reference to FIG. 5A. FIG. 5A is a graphical user interface 500 implemented by the software and/or hardware facilities to show orders 502a-504n disaggregated from market data 302. In some embodiments, the software and/or hardware facilities disaggregate orders 501 (e.g., 502a-502n) from market data 302 based on an order's quantity 504a-504n and/or entry time 506a-506n. For example, user interface 500 illustrates a disaggregated view of the overall quantity (e.g., 410a-410n) of price-quantity pairs 404a-404n, respectively. Total order quantity 410a, for example, is the sum of disaggregated quantities Q(A)-Q(c) 504a-504n. Similarly, total order quantities 410b-410n are each disaggregated by the software and/or hardware facilities into their corresponding disaggregated quantities 504d-504n. Raw market data from certain providers may already have enough detailed information to discern the specific orders, their quantities, and sequence at a given price; however, the software and/or hardware facilities can disaggregate data that is not processed.

Figure 5B:
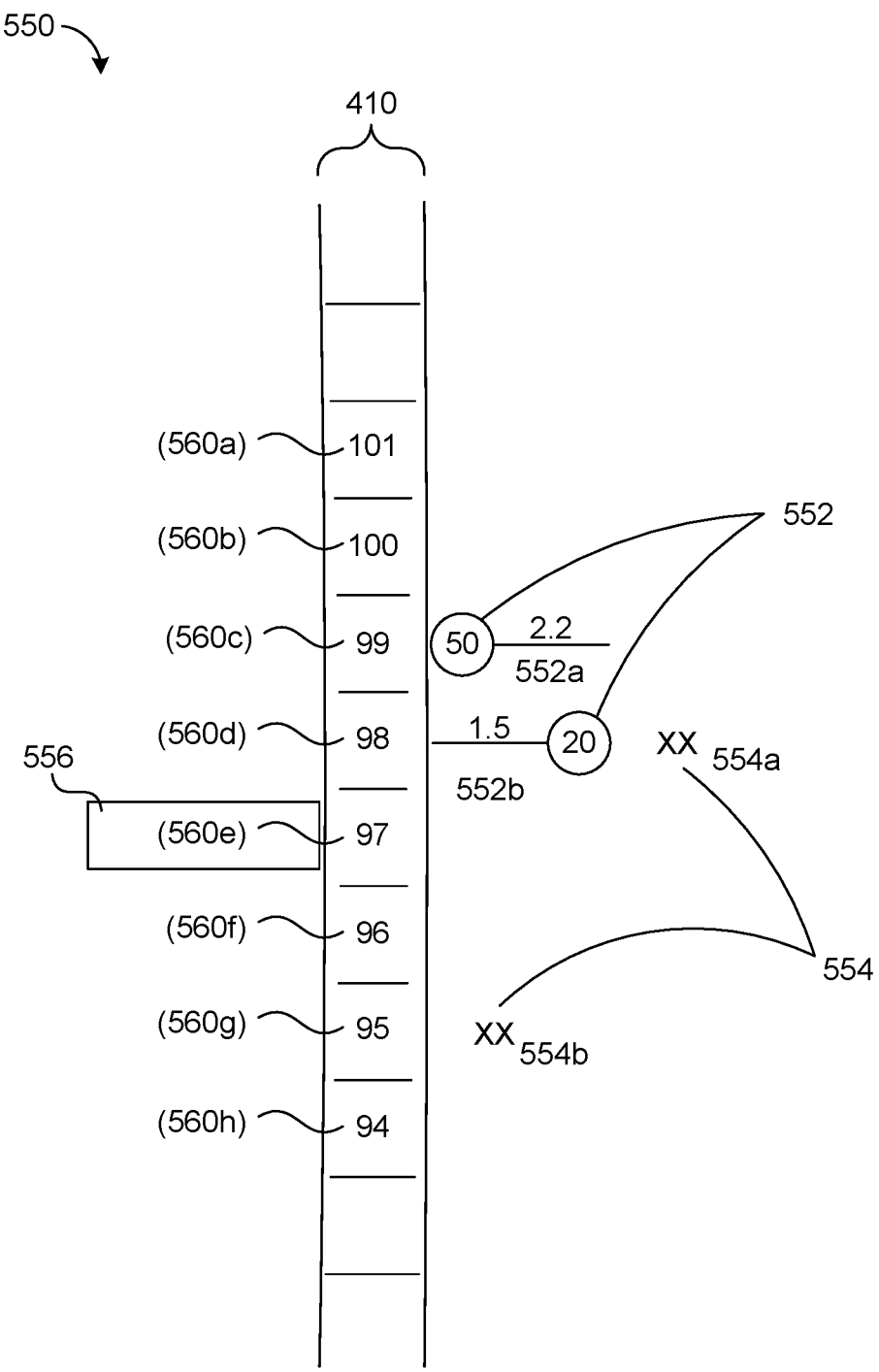
FIG. 5B is a graphical user interface of various graphical indicators emphasizing important market data.

The software and/or hardware facilities, in some embodiments, emphasize the display of one or more disaggregated groups 501 based on one or more of the variety of emphasis techniques mentioned above. For example, FIG. 5A depicts orders 502a-502n as 2D rectangles that are sized in proportion to their respective quantities 504a-504n and to the overall quantity 410a-410n at a respective price 408a-408n. Order 502c, for example, is represented by a larger rectangle than the rectangle used to represent orders 502a-502b because order 502c has a larger quantity 504c. For instance, if an overall quantity 410a is the sum of 100 oil contracts, then the software and/or hardware facilities, in some embodiments, present the disaggregated orders 501 as disaggregated quantity 504a (e.g., 30 orders), 504b (e.g., 10 orders) and 504c (e.g., 60 orders), based on the interpolation techniques mentioned above. The inventors have contemplated other techniques for distinguishing and emphasizing disaggregated data, such as using various graphical indicators (e.g., icons, shapes, graphs, charts, heat maps, pictures, videos, images, etc.) to represent one or more disaggregated orders 510. For example, FIG. 5B is a graphical user interface 550 that depicts various graphical indicators 552-556 that emphasize important market data 302. FIG. 5B includes an overall quantity (410) for each of various prices 560a-560h and graphical indicators (e.g., circles 552, "Xs" (554), and a rectangle 556). In some embodiments, one type of indicator represents orders with a user-defined quantity 552a-552b (e.g. orders of 50 items are represented as a circle), and another type of indicator depicts orders that were removed 554a-554b (e.g., an 'X'), for example.

In various embodiments, the software and/or hardware facilities determine when a disaggregated group 501 is displayed and how it is emphasized. For example, one or more disaggregated groups 501 can be selectively displayed or filtered based on each order's 502a-502n respective entry times 506a-506n. For instance, orders entry times 506a-506b that exceed a configurable threshold time (e.g., 24 hours) can be filtered by the software and/or hardware facilities from display. In various embodiments, the software and/or hardware facilities are configured to allow a trader/user to adjust how orders are emphasized. For example, the user-interface 500 can be configured to emphasize, using one or more of the variety of emphasis techniques, that all order quantities 504a-504n over 10 are displayed in one color, all orders under 10 are removed from displays, orders having a quantity 504d of 50 items flashed, or similar orders are highlighted, indicated as being part of an order detected in a pattern, among others. In some embodiments, the hardware and/or software facilities can selectively display one or more disaggregated groups 501 in a summary view, such as to generate a user interface that is configured for display on a small display screen of a device (e.g., a mobile device).

The software and/or hardware facilities, in some embodiments, generate and/or display synthetically generated information (e.g., implied orders, virtual orders, or orders that are not routed to an exchange) concurrently with (e.g., with the information overlays) a portion of the disaggregated orders 501. For example, a virtual order is placed and displayed in a position on user interface 500 similar to a position as if the virtual order was actually entered into the market. The virtual order can be tracked in real or near-real time with the disaggregated orders 501. In another example, disaggregated data 501 is illustrated as a graphical matrix of information (e.g., a heat map or fractal map) that can be displayed along with coalesced data and/or other representations of disaggregated data 501. In some embodiments, the software and/or hardware facilities present the user interface 500 as a non-linear and or linear object. The object is configurable to have a shape of a 2D or pseudo 3D object, such as a bar, an arc, curve, parabola, sphere, wheel, or other geometrical shape. For example, the user interface can be depicted as a wheel having one or more graphical representations of orders placed in a non-linear position (i.e., about the curve of a 2D or pseudo 3D wheel). The wheel of orders appears to rotate about a static axis, based at least on an indication that a datum of the market data has changed.

Figure 6:
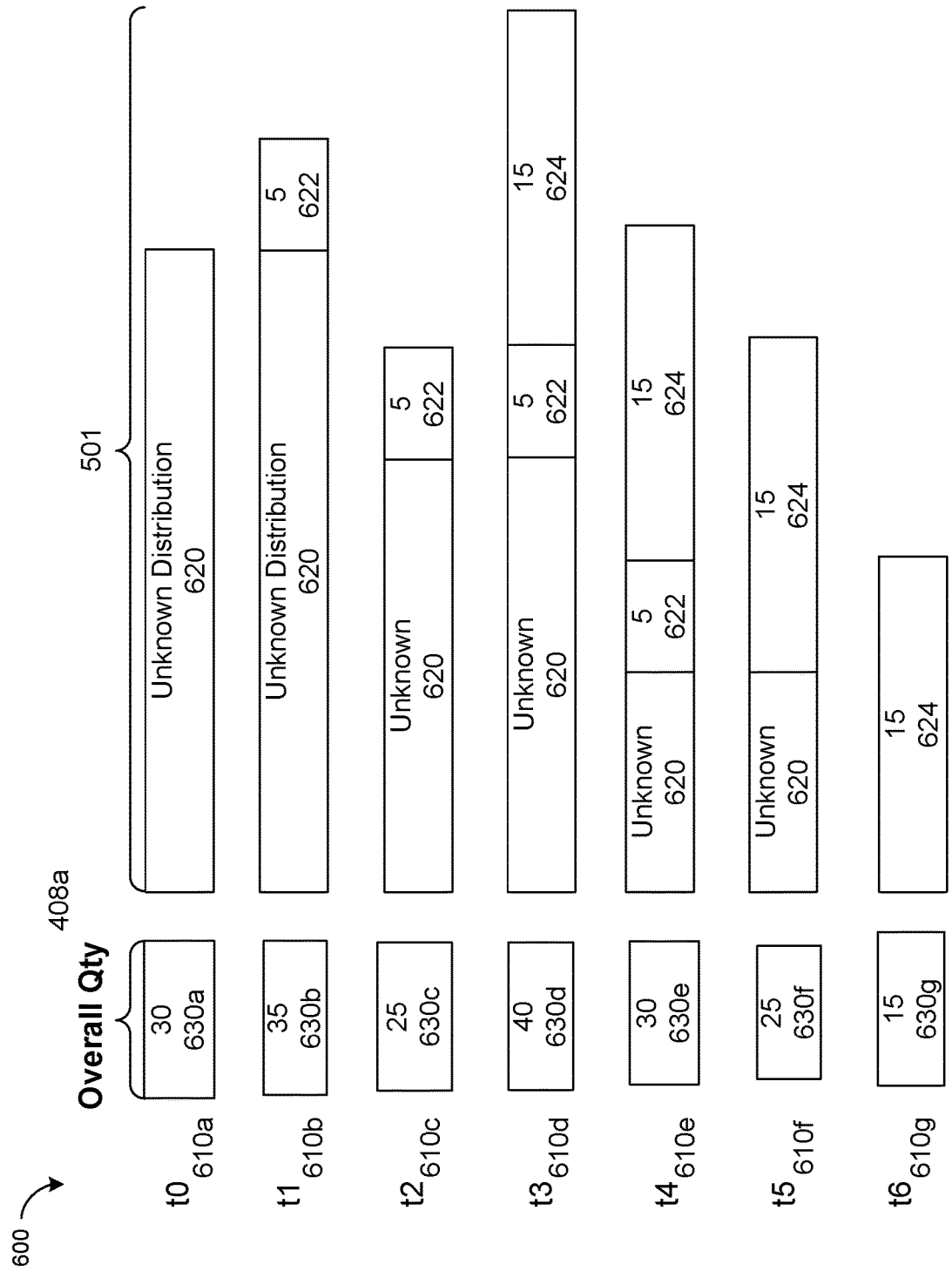
FIG. 6 is a graphical user interface showing a real or pseudo-real time progression of disaggregated orders for a single price.

FIG. 6 is a graphical user interface 600 showing a real or pseudo-real time progression 610a-610g of aggregated 620 and disaggregated orders 622-624 at a single price (e.g., $100). FIG. 6 shows movement of orders 620-624 over a period of time 610a-610e at a single price (e.g., $100); however, movement relative to a single price is for example purposes only and is not a limitation of the software and/or hardware facilities. At time to 610a, aggregated market data 620 is received and has an unknown quantity because, for example, it is start of the day or the software and/or hardware facilities did not receive sufficient information in market data 302 to determine additional fidelity. In some embodiments, aggregated market data 620 is assumed to consist of a single order having an overall quantity of 30 items 630a. Disaggregating orders is based at least on the type of information in the market data and the software and/or hardware's order estimation algorithm. The order estimation algorithm, in some embodiments, is hardware programmatically configured (e.g., using Boolean logic) to disaggregate and display orders based on the available (e.g., type/quality) of information in the market data 302. Given a market data provider that provides only overall quantity 410 at each price level, the software and/or hardware technology estimates the makeup of the disaggregated market data 501 over time. Using the magnitude (difference) of the quantity change between a first and a second time, for example, the software and/or hardware facilities estimates that single orders of a known size are being added or removed from disaggregated market data. Additional market data 302 provided by the provider improves the order estimation algorithm. For example, the market data provider may disseminate every single quantity change to their customers and or an overall count of distinct orders (an "OrderCount") at each price level. In other words, fidelity improves based on the quality of available information in the raw market data 302. In some embodiments, the order estimation algorithm can employ one or more machine learning techniques, such as applying a machine learning model trained as described herein.

At time $t_1$ 610b, the overall quantity 630a changes to 35 630b. The software and/or hardware facilities, in some embodiments, will determine and indicate that a new order of 5 items was added. At time $t_2$ 610c, the overall quantity 630b decreases to 25 610c. The software and/or hardware facilities, in various embodiments, determines that 10 items from unknown aggregated market data 620 were removed, based on the presence of an order of 5 622. In response, the user interface 600 is updated by removing 10 items from aggregated order 620. At time $t_3$, the overall quantity 610c changes from 25 to 40 610d; therefore, it's likely that new order 624 of 15 items were added. At time $t_4$ 610e, the overall quantity 408a decreases by 10 to 30 630e. The software and/or hardware facilities, in some embodiments, decreases the aggregated market data 620 by 10 items because neither of the last two orders 622 or 624 had quantities of 10 items, for example. At time $t_5$ 610f, the overall quantity 408 changes by 5 to 25 630f. In various embodiments, the software and/or hardware facilities will remove order 622 because it corresponds to the order for 5 items that was removed from order 620 and because the software and/or hardware may not have sufficient details to determine that the decrease corresponds to aggregated market data 620. At time $t_6$, the overall quantity 408e to 15 680g. This indicates a likelihood that order 614, previously entered at time $t_3$, is a single order for 15 items.

Figure 7:
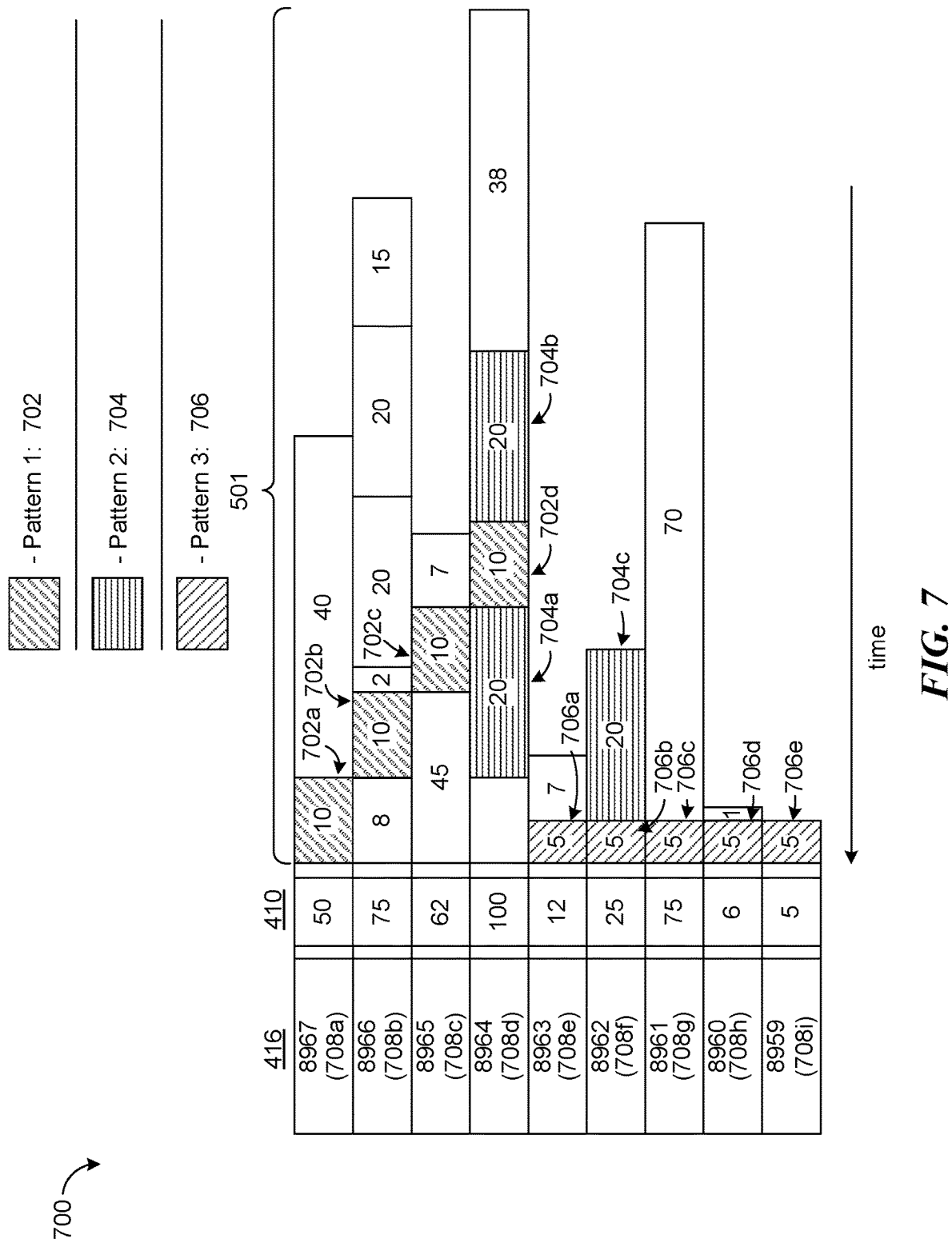
FIG. 7 is a graphical user interface showing various patterns of disaggregated orders at different prices.

Returning to FIG. 2, at step 208, the software and/or hardware facilities, in some embodiments, detect one or more patterns and/or user-defined characteristics in the market data 302, as described in reference to FIG. 7. In some embodiments, detecting patterns and/or user-defined characteristics can be performed using a machine learning model, such as a machine learning model trained as described with reference to FIG. 10. FIG. 7 is a graphical user interface 700 generated by the software and/or hardware facilities that show various patterns (e.g., pattern 1 702, pattern 2 704, and pattern 3 706) within disaggregated orders 501 at different prices 708a-708i. Pattern 1 702 is indicated on user-interface 700 as three shaded orders 702a-702c disaggregated orders 501, each represented by a proportionally sized rectangle having 10 items. As mentioned above, each order 702a-702e can be represented using a variety of graphical shapes and sizes and is not limited to the rectangle depicted in FIG. 7. In regard to pattern 1 702, the software and/or hardware facilities detects that orders 702a-702a are similar and potentially a result of computer-automated trading because, for example, each order 702a-702c is for the same quantity of 10 items spread across three different adjacent prices 602a-602b and placed using staggered timing. A second pattern (i.e., pattern 2) 704 is shown in the disaggregated orders 501 as three horizontally shaded orders 704a-704c. The trader can configure the software and/or hardware facilities to identify a set of orders (e.g., 704a-704e) based on their timing and or their quantity. For example, pattern 2 indicates every occurrence of an order of 20 items; however, the software and/or hardware facilities can be configured to indicate other aspects of the disaggregated data 401. For instance, in various embodiments, to identify similar orders, a trader selects a first order (e.g., 704*c*) to find/emphasis other orders (e.g., 704*a*-704*b*) that have the same number of items, for example. A trader may select an order (e.g., 704*c*) via any one or more of a variety of techniques, such as a finger tap or slide, a mouse click or hover, voice activation, eye movement, a gesture, etc. A third pattern 706, includes orders 706*a*-706*e*. The software and/or hardware facilities detect pattern 3 706 based on, for example, the quantity, time, and prices 602*e*-602*i* for orders 706*a*-706*e*. Pattern 3 706 may indicate that a trader is attempting to corner the market (e.g., take first position across a number of prices 602*e*-602*f*). Pattern 1, pattern 2, and pattern 3 can be detected, in some embodiments, using one or more data disaggregation models, which can be machine learning models trained as described with reference to FIG. 10.

In some embodiments, one or more of patterns 702-706 are emphasized using one or more of the above-mentioned emphasis techniques. For example, the software and/or hardware facilities can color-code, flash, highlight, animate, and/or display icons to indicate each of the orders 702*a*-702*c* represented by pattern 1 702. Similarly, the software and/or hardware facilities can emphasize pattern 2's 704 orders 704*a*-704*c* based on changing colors, fonts, or positions (e.g., appear to "wiggle" or animate) of the pattern 2 704. In some embodiments, the software and/or hardware facilities can alert the trader that a pattern is detected. For example, detection of pattern 3 706 can trigger an event, such as using any of the above-mentioned emphasis techniques and/or initiate an audible tone, send one or more email/SMS, and/or send a message to another trader using the software and/or hardware facilities. In some embodiments, a pattern 702-706 is emphasized using a combination of the above-mentioned emphasis techniques. For example, the software and/or hardware facilities can detect pattern 1 702, color code each of its orders 702*a*-702*c*, initiate an audible alert (e.g., a bell), and send an SMS message to the trader. In some embodiments, the software and/or hardware facilities is user configurable. A trader can adjust the software and/or hardware facilities to use any one or more of the above-mentioned techniques (e.g., adjust colors, rate at which an order flashes) to emphasize any one or more orders 702*a*-706*e* in the patterns 702-706.

In some embodiments, display of the graphical user interface 700 can be automatically adjusted to fit a small display screen, such as a display screen of a mobile device. For example, only a subset of orders 702*a*-706*e* and/or patterns 702-706 can be displayed in a summary view to emphasize important data and omit or deemphasize unimportant data (e.g., data unlikely to be used by the trader to execute a trade).

Figure 8:
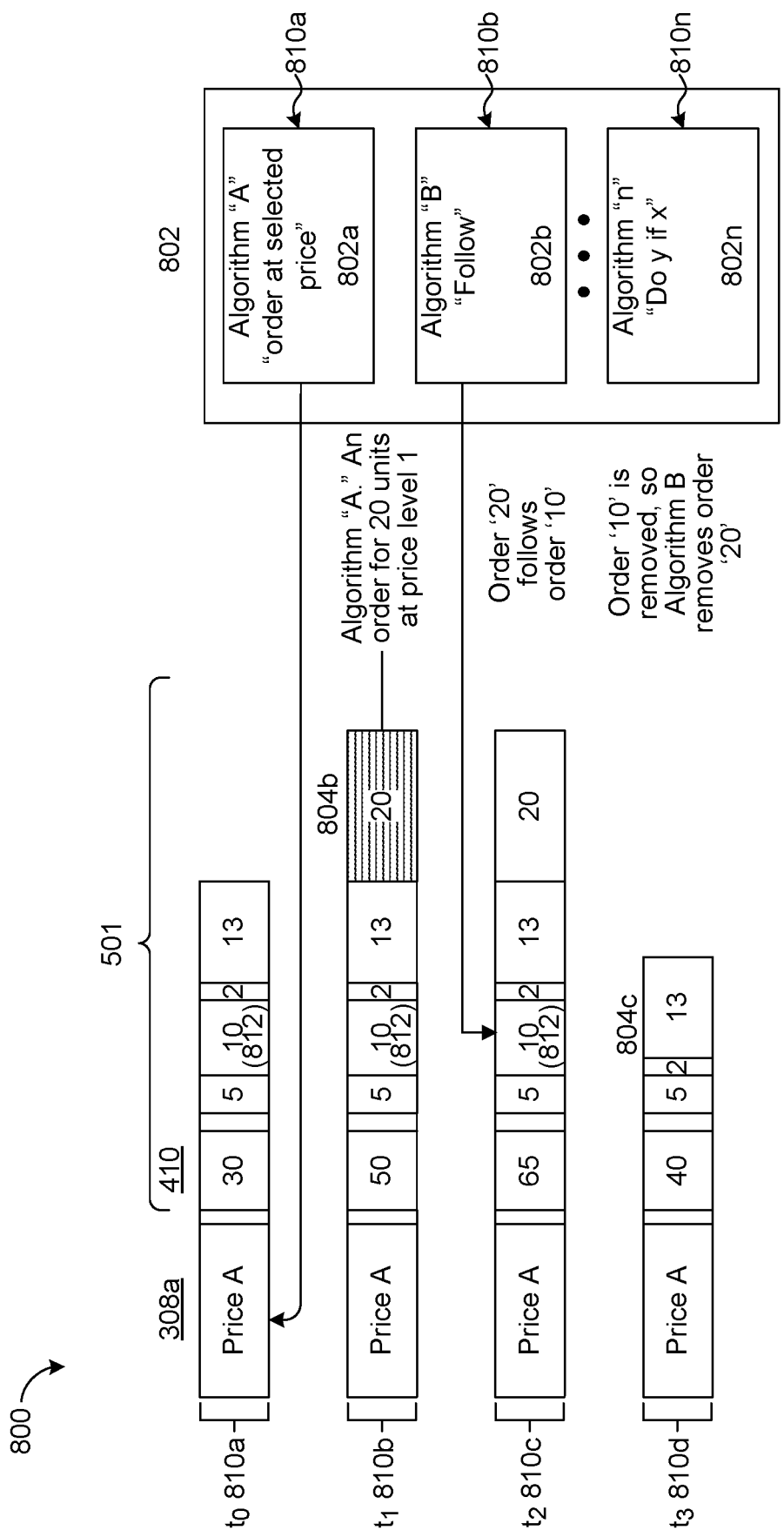
FIG. 8 is a graphical user interface configured to display for entering market orders based on disaggregated market information.

FIG. 8 is a graphical user interface 800 configured for entering market orders based on using disaggregated market information 501 as part of the order. Graphical user interface 800, in some embodiments, includes an area (e.g., a holding "pen") 802. The holding pen 802 includes one or more graphically represented, user-configurable order algorithms 802*a*-802*n*. An algorithm, in some embodiments, is a programmatic process for generating an order based on configurable variables and or conditions (e.g., make order A for quantity B if order C is modified). Algorithms are not limited to complex scenarios. In some embodiments, an algorithm is a basic buy/sell order algorithm. Order algorithms 802*a*-802*n*, in some embodiments, are represented by one or more shapes or graphics. For example, in FIG. 800, different order algorithms 802*a*-802*n* are each represented by a rectangle 810*a*-810*n*; however, any of the above-mentioned indicators are interchangeable (e.g., an icon). Placing a particular algorithm icon on an order causes the algorithm associated with that icon to be executed for that order. The software and/or hardware facilities include one or more techniques for placing a new order based on the position of the new order's algorithm's graphical representation. For example, orders 802*a*-802*n* can be configured to execute upon the occurrence of one or more events, such as placing a graphical representation 810*a*-810*n* of the order on another order. Placing an order is performed by using a mouse, finger, gesture, eye/hand movement, etc.

The software and/or hardware facilities, in some embodiments, executes an order (e.g., 802*a*) when its graphical representation 810*a*-810*n* is dragged and dropped onto or near a price 308*a*. For example, an order (e.g., 802*a*) of 20 items 804*b* of oil is placed at $93 (e.g., price 308*a*) when its rectangle 810*a* is dragged 804*a* to price 308*a*, at time to 810*a*. Order algorithm 802*n* indicates that an order 802*a*-802*n*, in some embodiments, is based on the satisfaction of a condition (e.g., "Do Y, if X"). Algorithm B 802*c* is configured to place an order that "follows" another order 812 (e.g., an order of 10 items) if Algorithm B's (802*b*) graphical representation 810*b* is dragged to order 812.

Following an order allows a trader to position his or her position in response to the followed. That is, an order can respond to a changed status of another order. For example, at time 1 810*b*, algorithm B 802*c* associates order 804*b* for 20 items with order 812 at $t_1$ 810*b*. The software and/or hardware facilities can modify order 804*b* based on a status of order 812. At time 3 810*c*, order 812 is canceled, fulfilled, or modified. In some embodiments, the software and/or hardware facilities trigger algorithm 802*b* to execute by, for example, cancelling order 804*b*, as shown at time 3 810*c*. In some embodiments, an order is made and or an algorithm is triggered at quantity based on the total quantity 410 and a selected portion of the disaggregated data 501. For example, at time 810*b*, the total quantity is 50, disaggregated into orders of 5, 10, 2, 13, and 20 items. Selecting (e.g., by a mouse, finger, gesture, eye/hand movement, etc.) any position along these disaggregated orders indicates a quantity of items for a new order or a trigger for an algorithm 802. A position halfway along the disaggregated data (e.g., within the 13-item order) selects a quantity of 25 items because 25 is half of the overall quantity 50. Still referring to t1 801*b*, selecting a position at the end of the disaggregated (e.g., at the end of order 20) selects a quantity of 50 items because 50 is the overall quantity at time t1 801*b*. Selecting a position at the beginning of the disaggregated (e.g., at start of order 5) selects a quantity of 1, for example, because this is the start of the overall quantity of 50 items. The selected position along the disaggregated data 501 is indicated (e.g., by a graphical indicator) as a reference to the trader. In various embodiments, the indicator is used to trigger an initiation of an algorithm 802. For example, the system and/or hardware facilities is configured to cancel, update, or modify a trader's order based on an overall quantity (e.g., 50) reaching a threshold (e.g., cancel my order for 25 items if the overall quantity drops below 30).

Figure 9:
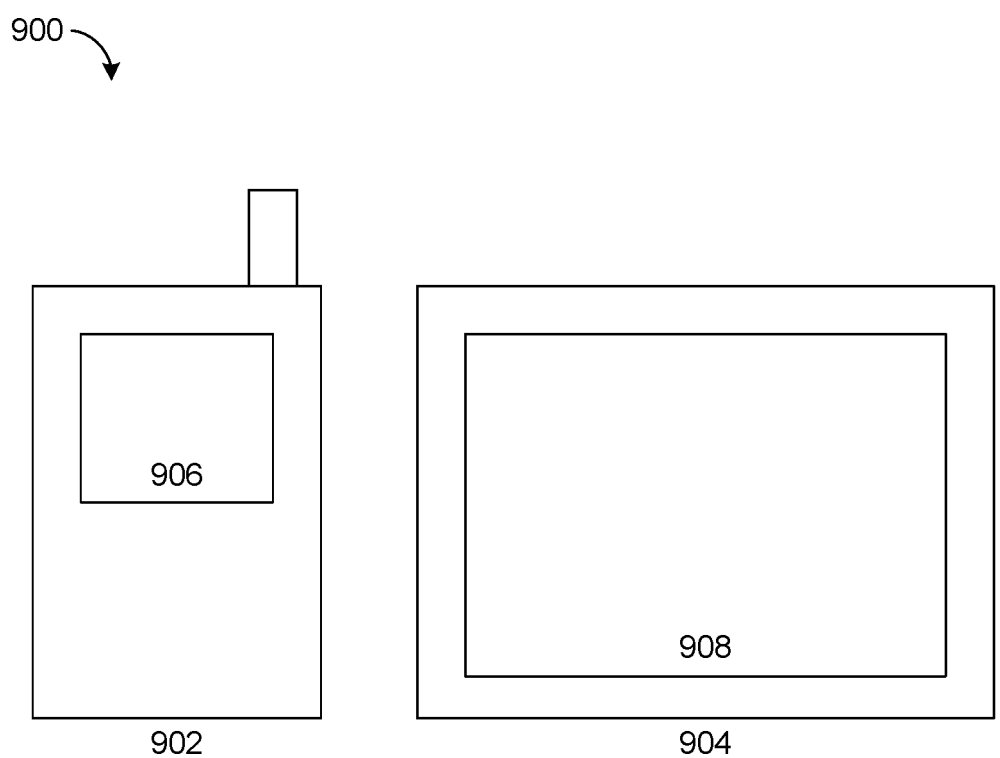
FIG. 9 are example embodiments of computing devices capable of implementing various features of the software and/or hardware facilities.

FIG. 9 are example embodiments 900 of computing devices capable of implementing various features of the software and/or hardware facilities. FIG. 9 includes handheld device 902 (e.g., a smartphone, pager, PDA, or other messaging device) and mobile device 904 (e.g., a tablet, laptop, hybrid computer, pseudo 3D display, etc.). Each device 902-904 has a corresponding display 906-908 that is configured to display features of the software and/or hardware facilities including features of FIGS. 3-8. In some embodiments, the displays 906-908 are touch screens configured to receive user input (e.g., a tap, slide, and gesture).

Figure 10:
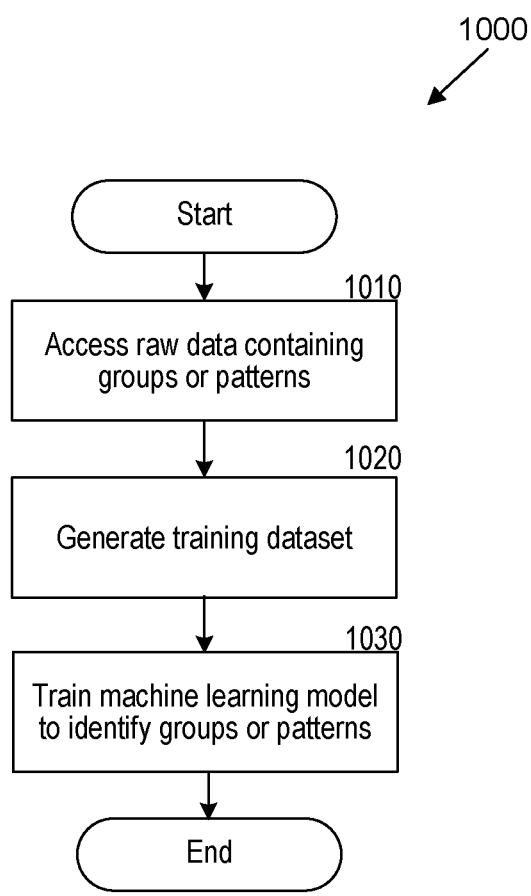
FIG. 10 is a diagram showing a process flow to train a machine learning model to identify groups and/or patterns of orders from raw data.

FIG. 10 is a diagram showing a process flow 1000 of the software and/or hardware facilities to train a machine learning model to identify groups and/or patterns of orders from raw data. The machine learning model can be, for example, a data disaggregation model. Additionally or alternatively, the machine learning model can be used to estimate orders within raw data. FIG. 10 includes blocks 1010-1030. At step 1010, raw data is received that contains groups and/or patterns. The received raw data can be, for example, market data 302 of FIG. 3. Patterns in the raw data can, for example, one or more of patterns 702-706 of FIG. 7. The raw data can represent all orders placed during a certain time period (e.g., the previous 7 days, 14, days, 30 days, 60 days). At least some of the orders in the received raw data are included in groups and/or patterns. Each order in the received raw data is associated with a quantity, a time, and a value.

At step 1020 a training dataset is generated using the received raw data. Generating the training dataset can include pre-processing the received raw data. For example, when the data comprises the market data 302 of FIG. 3, the other data 306a-306n can be filtered or removed (e.g., to reduce "noise" or unimportant information). One or more groups or patterns within the raw data can be identified or flagged. For example, orders within the raw data can be identified as being part of a group or pattern, and a type of group or pattern can be indicated. In some embodiments, a group of similar orders can be flagged as being likely a result of computer-automated trading because, for example, each order is for the same quantity of items spread across different adjacent values and placed using staggered timing. Another group of orders can be flagged as indicating that a user is likely attempting to corner the market (e.g., take first position across a number of prices). Other groups and/or patterns can be flagged based on, for example, similarities and/or patterns associated with values, quantities, and/or times. Additionally or alternatively, one or more characteristics associated with groups, orders, or patterns can be identified or calculated for inclusion in the training datasets, such as characteristics associated with timing, quantity, and/or value.

At step 1030 the generated training dataset is used to train a machine learning model to identify groups or patterns in new data. Once the machine learning model is trained, the trained machine learning model can receive raw data and identify, within the raw data, one or more patterns or groups associated with orders represented in the raw data.

In some implementations, the process flow 1000 can further include evaluating and/or retraining the trained machine learning model. For example, a portion of the training dataset generated at block 1020 can be held back as testing data to be used to evaluate accuracy of the trained machine learning model. When the trained machine learning model does not exceed a threshold accuracy, the machine learning model can be retrained. Retraining the machine learning model can include training the machine learning model at least a second time using the same training dataset, training the machine learning model with a different (e.g., expanded) training dataset, applying different weightings to a training dataset, rebalancing a training dataset, and so forth.

Although the process flow 1000 depicts training a machine learning model, multiple machine learning models can be trained. For example, the process flow 1000 can include training multiple machine learning models and selecting a machine learning model of the multiple machine learning models for application based on a highest accuracy. Additionally or alternatively, different machine learning models can be trained to identify different types of patterns or groups, and/or different machine learning models can be trained to estimate orders within raw data.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models can include a neural network with multiple input nodes that receive training datasets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used to detect groups and/or patterns within market data. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new market data.

Figure 11:
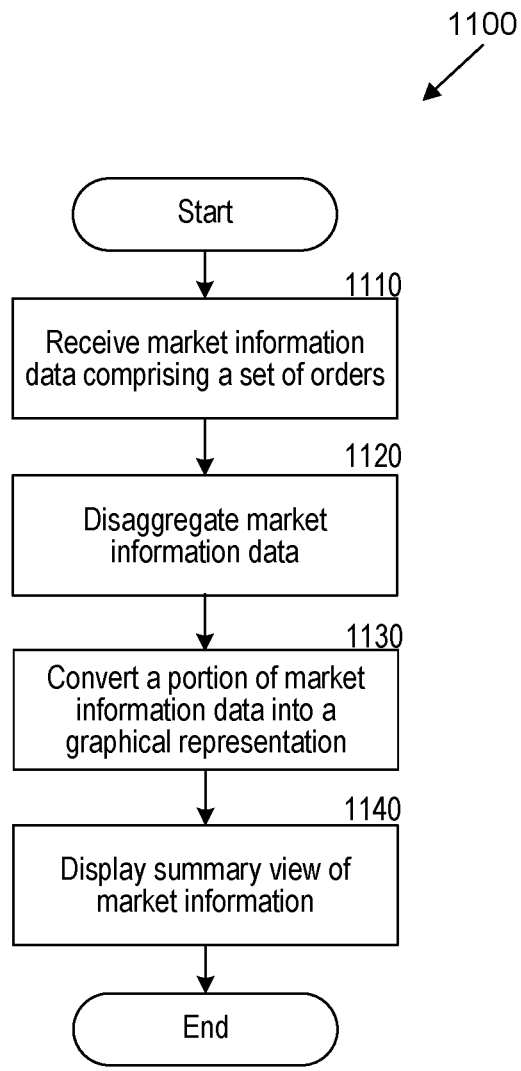
FIG. 11 is a diagram showing a process flow to generate an improved user interface.

FIG. 11 is a diagram showing a process flow 1100 used by the software and/or hardware facilities to generate an improved user interface, such as an interface configured for display on a small display screen. FIG. 11 includes blocks 1110-1140. The process flow 1100 generates an interface that allows a user to more quickly access relevant data, such as for display on a mobile device or a device with a small screen. At step 1110, raw data is received comprising a set of orders each associated with a value and a quantity. In some implementations, each order is also associated with a time and/or other data. The raw data can be in a non-standard format, for example, when the raw data comprises orders from different markets and/or data from different sources.

At step 1120, the received raw data is disaggregated. At least a portion of step 1120 can be performed using a data disaggregation model, such as machine learning model trained according to process flow 1000. Disaggregating the raw data includes determining a number of orders at each value, determining a quantity of items bid or offered at each value, and identifying similar orders (e.g., patterns or groups) within the set of orders. The similar orders can be identified based on a quantity in an order or group of orders, a quantity of orders in one or more groups of orders, and/or a time when an order or group of orders was entered.

At step 1130, a portion of the disaggregated data is converted into a graphical representation. In some implementations, converting the data into a graphical representation can include converting the data from the non-standard format to a standard format to allow for generating standard graphical representations for display on small screen devices. In some implementations, each order in the portion of orders can be sized in proportion to a total number of orders at the particular value, or differentiated from a quantity of orders associated with other groups of orders. The portion of the disaggregated data can be selected for conversion based on a likelihood that a trader will use the data to execute a trade. For example, the hardware and/or software facilities can prioritize certain groups, patterns, or orders for display based on user-defined characteristics and/or other characteristics indicating the certain data is likely to be important to the trader. In some implementations, the characteristics used to prioritize data can be determined using a machine learning model, such as a data disaggregation model.

In some implementations, the portion of the data is selected based on one or more dimensions associated with a display screen on which the user interface is being displayed. For example, a greater or smaller portion of the data can be selected for display, depending on a screen size (e.g., physical and/or pixel dimensions). In another example, a greater or smaller portion of the data can be selected for display depending on the capacity of the memory of the display device. That is, a smaller memory capacity can limit the granularity of the displayed data. Thus, the process flow 1100 can generate a user interface that is configured for display on a device with a small screen.

At step 1140, a graphical user interface is generated comprising a summary view of the disaggregated data. For example, the summary view of the data can comprise the graphical representations of the orders in the converted portion of the data. One or more emphasis techniques can be applied to the summary view of the data, as described herein.

Conclusion

In general, the detailed description of embodiments of the software and/or hardware facilities is not intended to be exhaustive or to limit the technology to the precise form disclosed above. While specific embodiments of, and examples for, the technology are described above for illustrative purposes, various equivalent modifications are possible within the scope of the software and/or hardware facilities, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the software and/or hardware facilities provided herein can be applied to other systems, not necessarily the system described herein. The elements and acts of the various embodiments described herein can be combined to provide further embodiments.

These and other changes can be made to the software and/or hardware facilities in light of the above Detailed Description. While the above description details certain embodiments of the technology and describes the best mode contemplated, no matter how detailed the above appears in text, the software and/or hardware facilities can be practiced in many ways. The software and/or hardware facilities may vary considerably in its implementation details, while still being encompassed by the technology disclosed herein. As noted above, particular terminology used when describing certain features or aspects of the software and/or hardware facilities should not be taken to imply that the terminology is being redefined herein to be restricted to any specific characteristics, features, or aspects of the technology with which that terminology is associated. In general, the terms used in the following claims should not be construed to limit the software and/or hardware facilities to the specific embodiments disclosed in the specification, unless the above Detailed Description section explicitly defines such terms. Accordingly, the actual scope of the software and/or hardware facilities encompasses not only the disclosed embodiments, but also all equivalent ways of practicing or implementing the software and/or hardware facilities.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for", but use of the term "for" in any other context is not intended to invoke treatment under 35 U.S.C. § 112, ¶6.) Accordingly, the applicant reserves the right to pursue additional claims after filing this application to pursue such additional claim forms, in either this application or in a continuing application.

We claim:

1. A computing system having at least one processor, at least non-transitory one memory storing computer-executable instructions, which, when executed by the at least one processor, structured to perform operations to:
   receive a set of raw data, the set of raw data comprising a set of orders in a non-standard format;
   based on a determined pattern associated with a particular order characteristic in the received set of orders, generate a disaggregated order set comprising a plurality of order groupings, wherein the computing system is further caused to convert the raw data into a standard format;
   based at least on the determined pattern, determine at least a subset of the plurality of order groupings to display;
   for at least one of the determined subset of order groupings to display, automatically generate and display, in a first region of a graphical user interface, a first graphical object sized in proportion to a total number of orders in the determined subset or structured to be visually distinct based on the particular order characteristic;

generate and display, in a second region of the graphical user interface, a second graphical object representing a computer-executable algorithm;

detect user input relative to the graphical user interface, the input causing a change in placement of the second graphical object in relation to the first graphical object; and in response to detecting the user input, cause an automatic operation to be executed, by the computer-executable algorithm indicated by the second graphical object, in connection with an item in the at least one order grouping indicated by the first graphical object.

2. The system of claim 1, wherein the least one of the determined subset of order groupings is an offer grouping, and wherein the first graphical object is representative of the offer grouping, the instructions, when executed by the at least one processor, structured to perform operations to:

generate a third graphical object corresponding to a second determined subset of order groupings, the second determined subset of order groupings being a bid grouping; and size the third graphical object in proportion to the first graphical object.

3. The system of claim 1, wherein the particular order characteristic relates to at least one of a unit quantity, a unit value, an order entry time, an order frequency, an order periodicity, or an order source.

4. A computer-implemented method, the method comprising:

based on a pattern associated with a particular order characteristic in a set of orders, determining at least a subset of a plurality of order groupings to display;

for at least one of the determined subset of order groupings to display, automatically generating and displaying, in a first region of a graphical user interface, a first graphical object sized in proportion to a total number of orders in the determined subset or structured to be visually distinct based on the particular order characteristic;

generating and displaying, in a second region of the graphical user interface, a second graphical object representing a computer-executable algorithm;

detecting user input relative to the graphical user interface causing a change in placement of the second graphical object in relation to the first graphical object; and in response to detecting the user input, causing an automatic operation to be executed, by the computer-executable algorithm indicated by the second graphical object, in connection with an item in the at least one order grouping indicated by the first graphical object.

5. The method of claim 4, wherein the least one of the determined subset of order groupings is an offer grouping, and wherein the first graphical object is representative of the offer grouping, the method further comprising:

generating a third graphical object corresponding to a second determined subset of order groupings, the second determined subset of order groupings being a bid grouping; and sizing the third graphical object in proportion to the first graphical object.

6. The method of claim 4, wherein the particular order characteristic relates to at least one of a unit quantity, a unit value, an order entry time, an order frequency, an order periodicity, or an order source.

7. The method of claim 4, wherein the determined pattern is indicative of auto-trading or manual trading.

8. The method of claim 4, wherein the determined pattern is indicative of an order sequence.

9. The method of claim 4, wherein determining at least a subset of the plurality of order groupings to display is further based on a display area dimension.

10. The method of claim 4, wherein the first graphical object includes at least one of an icon, a geometric shape, a graph, a chart, a heat map, a picture, an animation, a video, or an image.

11. The method of claim 4, wherein the at least one of the determined subset of order groupings to display includes a market order.

12. The method of claim 4, wherein the at least one of the determined subset of order groupings to display includes a synthetic order.

13. The method of claim 4, wherein the automatic operation includes a trade.

14. The method of claim 4, wherein the automatic operation includes a "follow order" instruction.

15. The method of claim 4, wherein the automatic operation is a conditional operation.

16. One or more non-transitory computer-readable media having computer-executable instructions stored thereon that, when executed by at least one processor of a computing system, cause the computing system to perform operations comprising:

based on a pattern associated with a particular order characteristic in a set of orders, determining at least a subset of a plurality of order groupings to display;

for at least one of the determined subset of order groupings to display, automatically generating and displaying, in a first region of a graphical user interface, a first graphical object sized in proportion to a total number of orders in the determined subset or structured to be visually distinct based on the particular order characteristic;

generating and displaying, in a second region of the graphical user interface, a second graphical object representing a computer-executable algorithm;

detecting user input relative to the graphical user interface causing a change in placement of the second graphical object in relation to the first graphical object; and in response to detecting the user input, causing an automatic operation to be executed, by the computer-executable algorithm indicated by the second graphical object, in connection with an item in the at least one order grouping indicated by the first graphical object.

17. The media of claim 16, wherein the particular order characteristic relates to at least one of a unit quantity, a unit value, an order entry time, an order frequency, an order periodicity, or an order source.

18. The media of claim 16, wherein the first graphical object includes at least one of an icon, a geometric shape, a graph, a chart, a heat map, a picture, an animation, a video, or an image.

19. The media of claim 16, wherein the at least one of the determined subset of order groupings to display includes at least one of a market order and a synthetic order.

20. The media of claim 16, wherein the automatic operation includes at least one of a trade, a "follow order" instruction, or a conditional operation.

\* \* \* \* \*